US012756573B2

(12) United States Patent
Kim et al.

(10) Patent No.: US 12,756,573 B2
(45) Date of Patent: Oct. 6, 2026

(54) METHOD AND APPARATUS FOR GENERATING CONSENSUS FOR ENDURING NODE FAILURE

(71) Applicant: ELECTRONICS AND TELECOMMUNICATIONS RESEARCH INSTITUTE, Daejeon (KR)

(72) Inventors: Young Chang Kim, Daejeon (KR); Jin Tae Oh, Daejeon (KR); Jong Choul Yim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 120 days.

(21) Appl. No.: 18/962,997

(22) Filed: Nov. 27, 2024

(65) Prior Publication Data

US 2025/0193017 A1 Jun. 12, 2025

(30) Foreign Application Priority Data

Dec. 7, 2023 (KR) ........................ 10-2023-0176839

(51) Int. Cl.
*H04L 9/32* (2006.01)

(52) U.S. Cl.
CPC .................................. *H04L 9/3236* (2013.01)

(58) Field of Classification Search
CPC ...................................................... H04L 9/3236
See application file for complete search history.

(56) References Cited

U.S. PATENT DOCUMENTS

2019/0327084 A1* 10/2019 Oh ........................ H04L 9/0861
2019/0379538 A1* 12/2019 Oh ...................... G06F 16/1824
2021/0050993 A1* 2/2021 Mazzarella ........... H04L 9/0643
2021/0297239 A1 9/2021 Oh et al.
2021/0297267 A1* 9/2021 Tang .................. H04L 67/1097
(Continued)

FOREIGN PATENT DOCUMENTS

CN 111130790 A * 5/2020 ........... H04L 9/3236
CN 116527694 A * 8/2023 ......... H04L 67/1097
(Continued)

OTHER PUBLICATIONS

H.-S. Jin et al., "Trend Analysis of High-Performance Distributed Consensus Algorithms," Electronics and Telecommunications Trends, 2022, DOI: https://doi.org/10.22648/ETRI.2022.J.370107.

*Primary Examiner* — Darshan I Dhruv

(57) ABSTRACT

A method and an apparatus for generating a consensus are disclosed. According to an embodiment of a present disclosure, a method for generating a consensus includes calculating hash values using a header value of a block and a node list. The method also includes generating a candidate consensus by comparing the hash values with a threshold value. The method also includes generating a sorted candidate consensus by sorting node information in the candidate consensus. The method also includes generating a final consensus by selecting node information in the sorted candidate consensus as many as a consensus quorum based on a number of voting rights of each node. The node information is information on a node ID and a hash value pair.

17 Claims, 8 Drawing Sheets

(56) References Cited

U.S. PATENT DOCUMENTS

| | | | | |
|---|---|---|---|---|
| 2021/0314167 | A1* | 10/2021 | Liao | H04L 9/3247 |
| 2022/0027970 | A1* | 1/2022 | Kim | G06Q 30/0613 |
| 2022/0253432 | A1* | 8/2022 | Liu | G06F 16/2379 |
| 2023/0066169 | A1 | 3/2023 | Oh et al. | |
| 2023/0163963 | A1 | 5/2023 | Oh et al. | |
| 2023/0188367 | A1 | 6/2023 | Kim et al. | |
| 2023/0252191 | A1 | 8/2023 | Oh et al. | |
| 2025/0227037 | A1* | 7/2025 | Liao | H04L 41/30 |
| 2025/0267056 | A1* | 8/2025 | Wang | H04L 9/50 |

FOREIGN PATENT DOCUMENTS

| | | | | |
|---|---|---|---|---|
| CN | 113612614 | B * | 10/2023 | H04L 9/3247 |
| KR | 10-2143530 | B1 | 8/2020 | |
| KR | 10-2021-0072794 | A | 6/2021 | |
| KR | 10-2021-0157456 | A | 12/2021 | |
| KR | 10-2022-0133850 | A | 10/2022 | |
| KR | 10-2023-0023555 | A | 2/2023 | |
| KR | 10-2023-0046061 | A | 4/2023 | |
| KR | 10-2023-0090027 | A | 6/2023 | |

* cited by examiner

METHOD AND APPARATUS FOR GENERATING CONSENSUS FOR ENDURING NODE FAILURE

CROSS-REFERENCE TO RELATED APPLICATION

The present application is based on, and claims priority from, Korean Patent Application Number 10-2023-0176839, filed Dec. 7, 2023, the disclosure of which is incorporated by reference herein in its entirety.

TECHNICAL FIELD

The present disclosure relates to a method and apparatus for generating a consensus for enduring a node failure, and more particularly, to a method and apparatus for generating a consensus, capable of proceeding with an agreement even if a node failure occurs during an agreement in a blockchain network.

BACKGROUND

The content described below simply provides background information related to the present embodiment and does not constitute prior art.

Blockchain is a data distribution processing technology that distributes and stores data regarding transaction details that may be generated by all users participating in a network. Transaction details generated by users over a certain period of time are confirmed through the agreement of more than half of the users. Confirmed transaction details are bundled into one block and stored in the blockchain. In order to change the transaction details stored in the blockchain, the agreement of more than half of the users should be obtained for the corresponding block and all blocks connected after the corresponding block, so it is impossible to practically forge or modify the data stored in the blockchain.

In the blockchain network, an agreement is performed using a consensus generated using nodes. While performing the agreement, a failure may occur in a specific node among the nodes used to generate the consensus. In this case, if a new consensus is generated by replacing the specific node in which a failure occurs and the agreement proceeds again, the agreement may not be interrupted. Here, if the specific node in which the failure occurs is a chair node, there is a problem in that the agreement is interrupted because the chair node cannot be replaced. Therefore, it is necessary to ensure that the agreement is not interrupted even if a failure occurs in the chair node while an agreement is performed.

SUMMARY

In view of the above, the present disclosure is to generate a consensus using nodes having the number of a voting right equal to or less than a predetermined number.

In addition, according to an embodiment, the present disclosure is to delete information on nodes in which a failure occurs in a candidate consensus, update the candidate consensus, and generate a final consensus using the updated candidate consensus.

The problems to be solved by the present disclosure are not limited to the problems mentioned above, and other problems not mentioned may be clearly understood by those skilled in the art from the description below.

According to the present disclosure, a method for generating a consensus includes calculating hash values using a header value of a block and a node list. The method also includes generating a candidate consensus by comparing the hash values with a threshold value. The method also includes generating a sorted candidate consensus by sorting node information in the candidate consensus. The method also includes generating a final consensus by selecting node information in the sorted candidate consensus as many as a consensus quorum based on a number of voting rights of each node. The node information is information on a node ID and a hash value pair.

According to the present disclosure, a method for generating a consensus includes calculating hash values using a header value of a block and a node list. The method also includes generating a candidate consensus by comparing the hash values with a threshold value. The method also includes generating a sorted candidate consensus by sorting node information in the candidate consensus. The method also includes generating a first final consensus by selecting node information in the sorted candidate consensus as many as a consensus quorum and performing an agreement. The method also includes generating a first candidate consensus by deleting node information on a chair node from among the node information in the sorted candidate consensus when a failure occurs in the chair node during the agreement. The method also includes generating a second final consensus using node information in the first candidate consensus. The node information is information on a node ID and a hash value pair.

According to the present disclosure, an apparatus for generating a consensus includes a memory and a plurality of processors. At least one of the plurality of processors is configured to calculate hash values using a header value of a block and a node list. The at least one of the plurality of processors is also configured to generate a candidate consensus by comparing the hash values with a threshold value. The at least one of the plurality of processors is also configured to generate a sorted candidate consensus by sorting node information in the candidate consensus. The at least one of the plurality of processors is also configured to generate a final consensus by selecting node information in the sorted candidate consensus as many as a consensus quorum based on a number of voting rights of each node. The node information is information on a node ID and a hash value pair.

According to the present disclosure, there is an effect of generating a consensus using nodes having the number of a voting right equal to or less than a predetermined number, so that consensus may proceed even if a node failure occurs during an agreement.

In addition, according to an embodiment, information on nodes in which a failure occurs in a candidate consensus, the candidate consensus is updated, and a final consensus is generated using the updated candidate consensus, so that consensus may proceed even if a node failure occurs in a chair node during an agreement.

The effects that may be obtained from the present disclosure are not limited to the effects mentioned above, and other effects not mentioned may be clearly understood by those skilled in the art from the description below.

DETAILED DESCRIPTION

Figure 1:
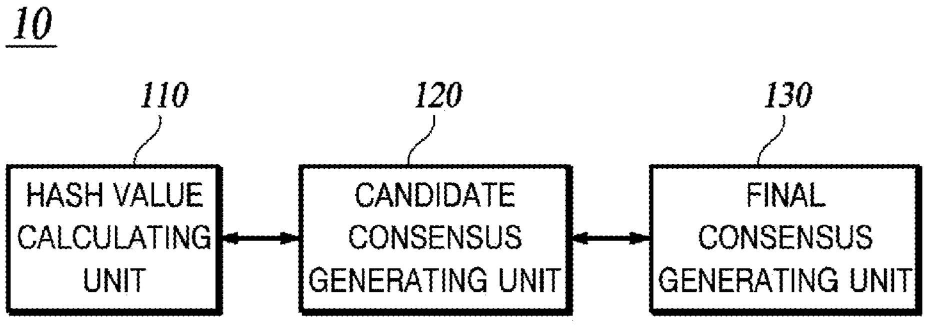
FIG. 1 is a block diagram illustrating an apparatus for generating a consensus, according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure, and is not intended to represent the only embodiments in which the present disclosure may be practiced.

FIG. 1 is a block diagram illustrating an apparatus for generating a consensus, according to an embodiment of the present disclosure.

Referring to FIG. 1, an apparatus for generating a consensus (hereinafter, referred to as a 'consensus generating apparatus 10') includes all or some of a hash value calculating unit 110, a candidate consensus generating unit 120, and a final consensus generating unit 130. The consensus generating apparatus 10 and each of the components thereof may be implemented as hardware or software or may be implemented as a combination of hardware and software. In addition, the function of each component may be implemented as software, and one or more processors may be implemented to execute the function of the software corresponding to each component.

The hash value calculating unit 110 calculates hash values using a header value of an agreed upon block and ID values of nodes. Hash values are calculated using a hash function and a hash operation. For example, the hash function may be secure hash algorithm 256 (sha256). The hash value may consist of only some of output bits of the hash function. For example, the hash value may consist of only 32 bits, which are some of the output bits of sha256 of the hash function. The hash value calculating unit 110 calculates hash values based on the number of voting rights of the nodes. For example, if a node has three voting rights, the hash value calculating unit 110 may calculate three hash values, while increasing an ID value.

The candidate consensus generating unit 120 compares the calculated hash values with a threshold value to generate a candidate consensus. The threshold value may be any value. The threshold value may be a predefined value. The candidate consensus generating unit 120 adds node information including only hash values less than or equal to the threshold value to the candidate consensus. Here, the node information may be information on a [node ID, hash value] pair. The candidate consensus generating unit 120 sorts the node information in the candidate consensus in descending order of hash value.

The final consensus generating unit 130 generates a final consensus using the candidate consensus and node information as many as (3f+1), which is a consensus quorum. For example, when the consensus quorum is 7, the final consensus generating unit 130 may generate the final consensus by selecting the first node information to seventh node information from the candidate consensus sorted in descending hash value order. Here, f may be any predefined positive integer.

Figure 2:
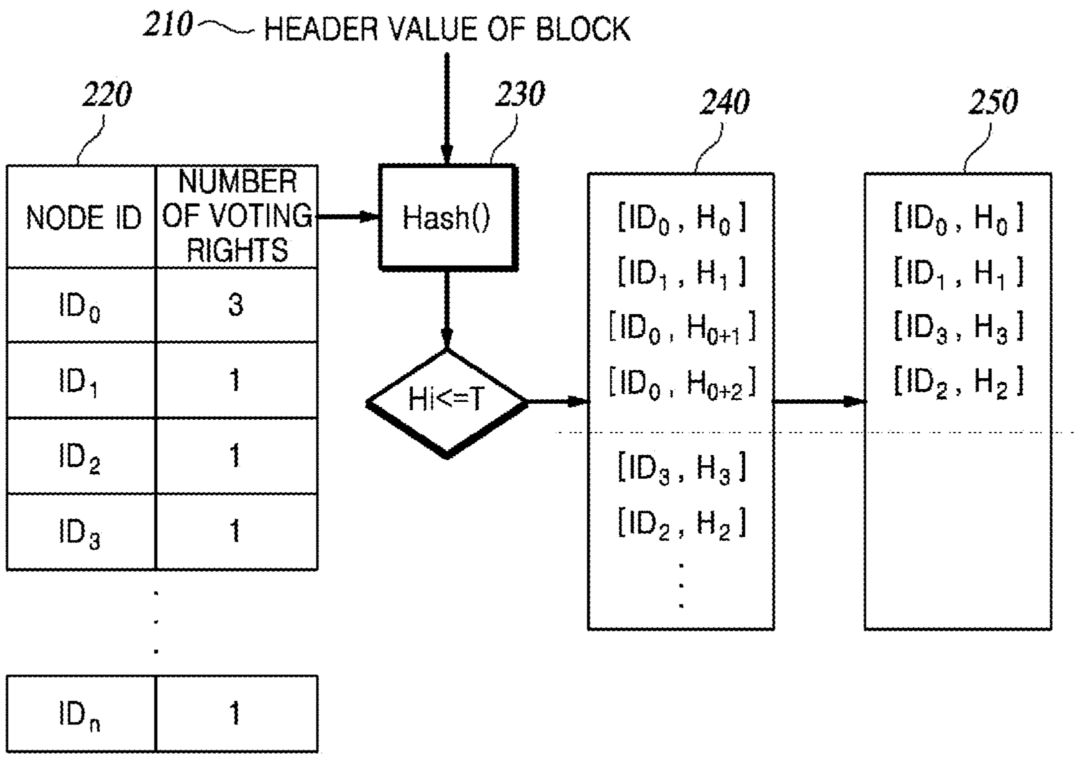
FIG. 2 is a diagram illustrating a method of generating a consensus for enduring a node failure, according to an embodiment of the present disclosure.

FIG. 2 is a diagram illustrating a method of generating a consensus for enduring a node failure, according to an embodiment of the present disclosure.

Referring to FIG. 2, the hash value calculating unit 110 calculates hash values using a header value 210 of a block and a node list 220. The node list 220 includes information on IDs of nodes and the number of voting rights of each node. The node list 220 has the same information for all nodes. The hash value calculating unit 110 calculates hash values using the ID of each node, the header value 210 of the block, and the hash function 230. The hash value calculating unit 110 calculates hash values using the number of voting rights of each node. Since node 0, whose node ID is ID0, has three voting rights, the hash value calculating unit 110 may calculate three hash values, H0, H0+1, and H0+2, for node 0. Since node 1, whose node ID is ID1, has one voting right, the hash value calculating unit 110 may calculate one hash value, H1, for node 1. Since node 2, whose node ID is ID2, has one voting right, the hash value calculating unit 110 may calculate one hash value, H2, for node 2. Since node 3, whose node ID is ID3, has one voting right, the hash value calculating unit 110 may calculate one hash value, H3, for node 3. Since node n, whose node ID is IDn, has one voting right, the hash value calculating unit 110 may calculate one hash value, Hn, for node n.

The candidate consensus generating unit 120 generates a candidate consensus 240 by comparing each calculated hash value Hi with a threshold value T. The candidate consensus generating unit 120 generates the candidate consensus 240 using node information including hash values that are less than or equal to the threshold value T. The candidate consensus generating unit 120 may generate the candidate consensus 240 by using [ID0, H0], [ID0, H0+1], [ID0, H0+2], [ID1, H1], [ID2, H2], and [ID3, H3]. The candidate consensus generating unit 120 sorts the node information in the candidate consensus 240 in descending order of hash values. The candidate consensus generating unit 120 may sort the node information in the candidate consensus 240 in order of [ID0, H0], [ID1, H1], [ID0, H0+1], [ID0, H0+2], [ID3, H3], and [ID2, H2] which is descending order of hash values.

The final consensus generating unit 130 generates the final consensus 250 using the candidate consensus 240 and the consensus quorum (3f+1). Here, f may be any positive integer. f may be a predefined value. When f is 1, the final consensus generating unit 130 may generate the final consensus 250 using four node information. The final consensus generating unit 130 generates the final consensus 250 so that the number of voting rights of each node included in the final consensus 250 does not exceed f. The node included in the final consensus 250 is a node having the ID of the node information included in the final consensus 250. If f is 1, the number of voting rights of each node included in the final consensus 250 should not exceed 1. If f is 1, the final consensus generating unit 130 may generate the final consensus 250 using [ID0, H0], [ID1, H1], [ID3, H3], and [ID2, H2] among the node information in the candidate consensus 240. [ID0, H0+1] and [ID0, H0+2] may not be used to generate the final consensus 250 because the voting right of node 0 included in the final consensus 250 should not exceed 1.

Figure 3:
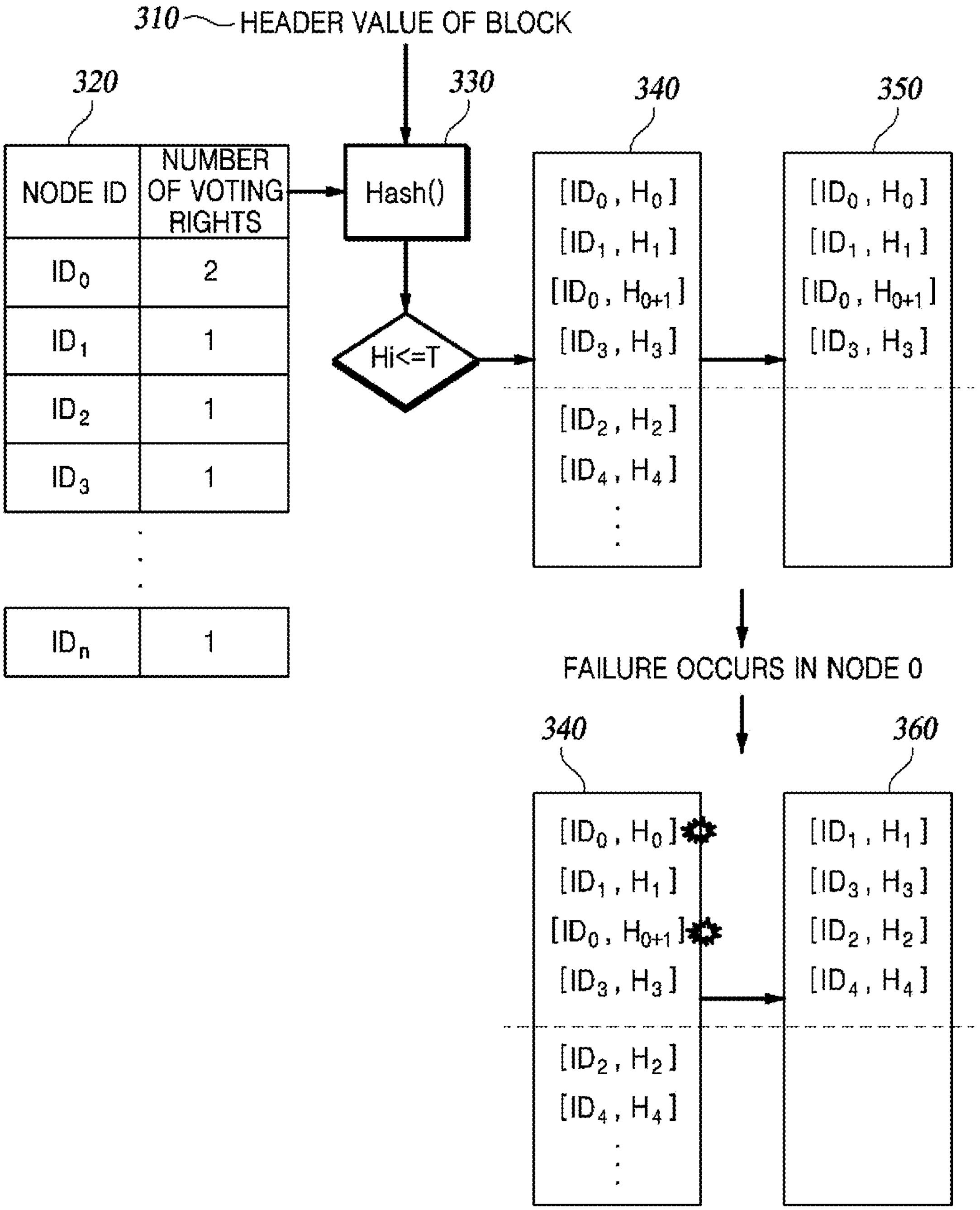
FIG. 3 is a diagram illustrating a method of generating a consensus for enduring a failure of a chair node, according to an embodiment of the present disclosure.

FIG. 3 is a diagram illustrating a method of generating a consensus for enduring a failure of a chair node, according to an embodiment of the present disclosure.

Referring to FIG. 3, the hash value calculating unit 110 calculates hash values using a header value 310 of a block and a node list 320. The hash value calculating unit 110 calculates hash values using the ID of each node, the header value 310 of the block, and a hash function 330. The hash value calculating unit 110 calculates hash values using the number of voting rights of each node. Since node 0, whose node ID is ID0, has two voting rights, the hash value calculating unit 110 may calculate two hash values, H0 and H0+1, for node 0. Since node 1, whose node ID is ID1, has one voting right, the hash value calculating unit 110 may calculate one hash value, H1, for node 1. Since node 2, whose node ID is ID2, has one voting right, the hash value calculating unit 110 may calculate one hash value, H2, for node 2. Since node 3, whose node ID is ID3, has one voting right, the hash value calculating unit 110 may calculate one hash value, H3, for node 3. Since node n, whose node ID is IDn, has one voting right, the hash value calculating unit 110 may calculate one hash value, Hn, for node n.

The candidate consensus generating unit 120 generates a candidate consensus 340 by comparing each calculated hash value Hi with a threshold value T. The candidate consensus generating unit 120 generates the candidate consensus 340 using node information including hash values that are less than or equal to the threshold value T. The candidate consensus generating unit 120 may generate the candidate consensus 340 by using [ID0, H0], [ID0, H0+1], [ID1, H1], [ID2, H2], [ID3, H3], and [ID4, H4]. The candidate consensus generating unit 120 sorts the node information in the candidate consensus 340 in descending order of hash values. The candidate consensus generating unit 120 may sort the node information in the candidate consensus 340 in order of [ID0, H0], [ID1, H1], [ID0, H0+1], [ID3, H3], [ID2, H2], and [ID4, H4] which is descending order of hash values.

The final consensus generating unit 130 generates the final consensus 350 using the candidate consensus 340 and the consensus quorum (3f+1). When f is 1, the final consensus generating unit 130 may generate the final consensus 350 using four pieces of node information. The final consensus generating unit 130 generates the final consensus 350 without limitation on the number of voting rights of each node included in the final consensus 350. If f is 1, the final consensus generating unit 130 may generate the final consensus 350 using [ID0, H0], [ID1, H1], [ID0, H0+1], and [ID3, H3] among the node information in the candidate consensus 340.

If f is 1 and the hash value H0 has the smallest hash value among the hash values in the final consensus 350, node 0 included in the final consensus 350 may be a chair node because it has the smallest hash value H0. The node included in the final consensus 350 is a node having the ID of the node information included in the final consensus 350. Node 0 may be a chair node because it has the smallest hash value. If a failure occurs in the chair node, the candidate consensus generating unit 120 deletes the node information on the chair node in the candidate consensus 340. If a failure occurs in node 0, which is the chair node, the candidate consensus generating unit 120 may delete [ID0, H0] and [ID0, H0+1], which are node information for node 0, in the candidate consensus 340. The final consensus generating unit 130 generates a new final consensus 360 using the candidate consensus 340 from which the node information on the chair node has been deleted. The final consensus generating unit 130 generates a new final consensus 360 using the candidate consensus 340 from which the node information on node 0 has been deleted. The final consensus generating unit 130 may generate the new final consensus 360 using [ID1, H1], [ID3, H3], [ID2, H2], and [ID4, H4] among the node information in the candidate consensus 340 from which the node information for node 0 has been deleted.

Figure 4:
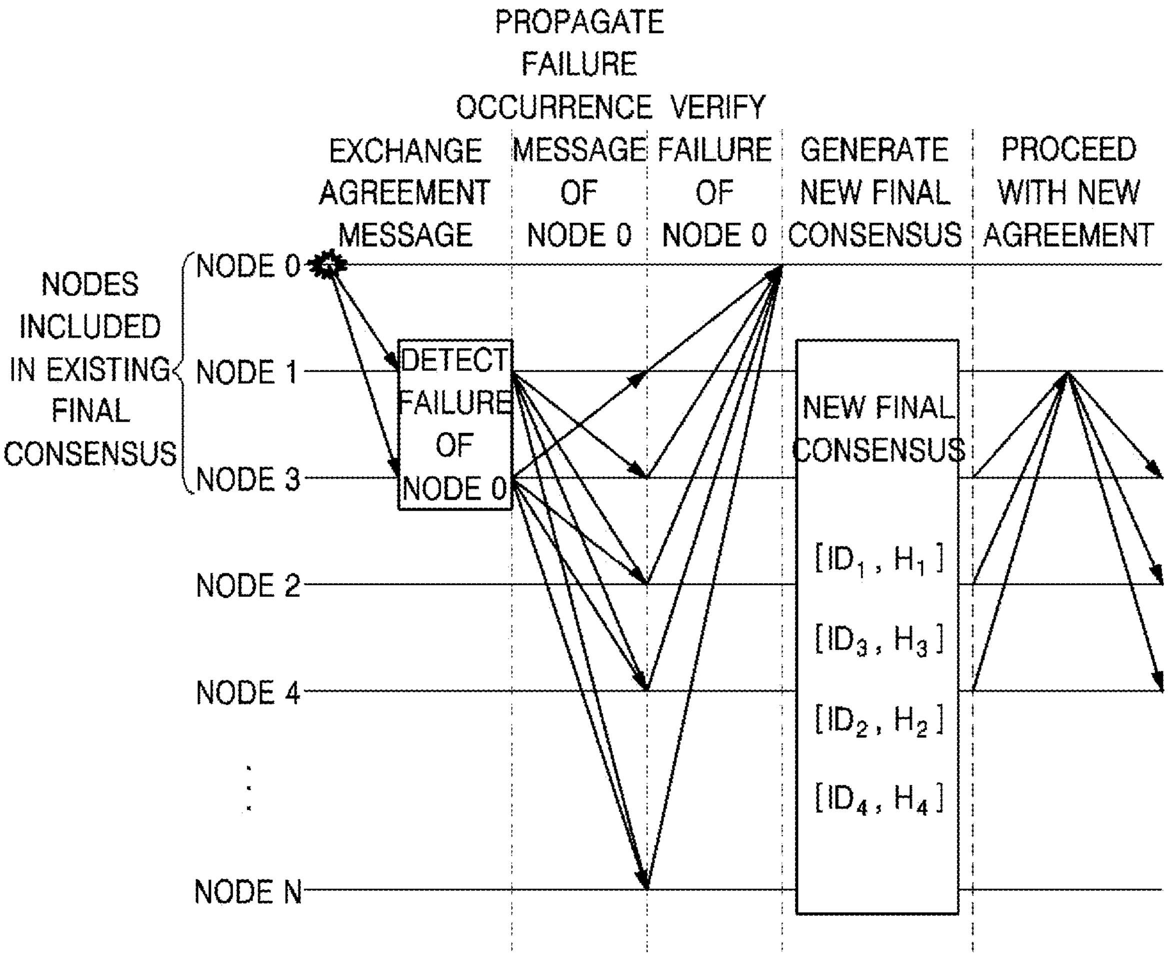
FIG. 4 is a diagram illustrating an operation of nodes and a process of an agreement when a failure occurs in a chair node, according to an embodiment of the present disclosure.

FIG. 4 is a diagram illustrating an operation of nodes and a process of an agreement when a failure occurs in a chair node, according to an embodiment of the present disclosure.

Referring to FIG. 4, the nodes included in the existing final consensus may be node 0, node 1, and node 3. Here, node 0 may be a chair node. If a failure occurs in node 0, the chair node, while node 0, node 1, and node 3 perform an agreement, while exchanging agreement messages, node 1 and node 3 may detect the failure of node 0. If node 1 and node 3 do not receive an agreement message from node 0 within a preset time, node 1 and node 3 may detect a failure in node 0. Node 1 and node 3 may transmit a failure occurrence message of node 0 to mode nodes connected to the blockchain network. All nodes excluding node 0 may verify the failure of node 0 by performing a packet internet groper (ping) test. Once the failure of node 0 is verified, all nodes excluding node 0 may confirm the failure of node 0.

When the failure of node 0 is confirmed, the candidate consensus generating unit 120 deletes the node information on node 0 in the candidate consensus. The final consensus generating unit 130 may generate a new final consensus using a candidate consensus from which the node information on node 0 has been deleted. The final consensus generating unit 130 may generate the new final consensus using nodes that may replace the number of voting rights of node 0. The final consensus generating unit 130 may generate the new final consensus using node 2 and node 4 to replace node 0. Accordingly, the new final consensus may include node 1, node 2, node 3, and node 4. Thereafter, node 1, node 2, node 3, and node 4 may perform a new consensus.

Figure 5:
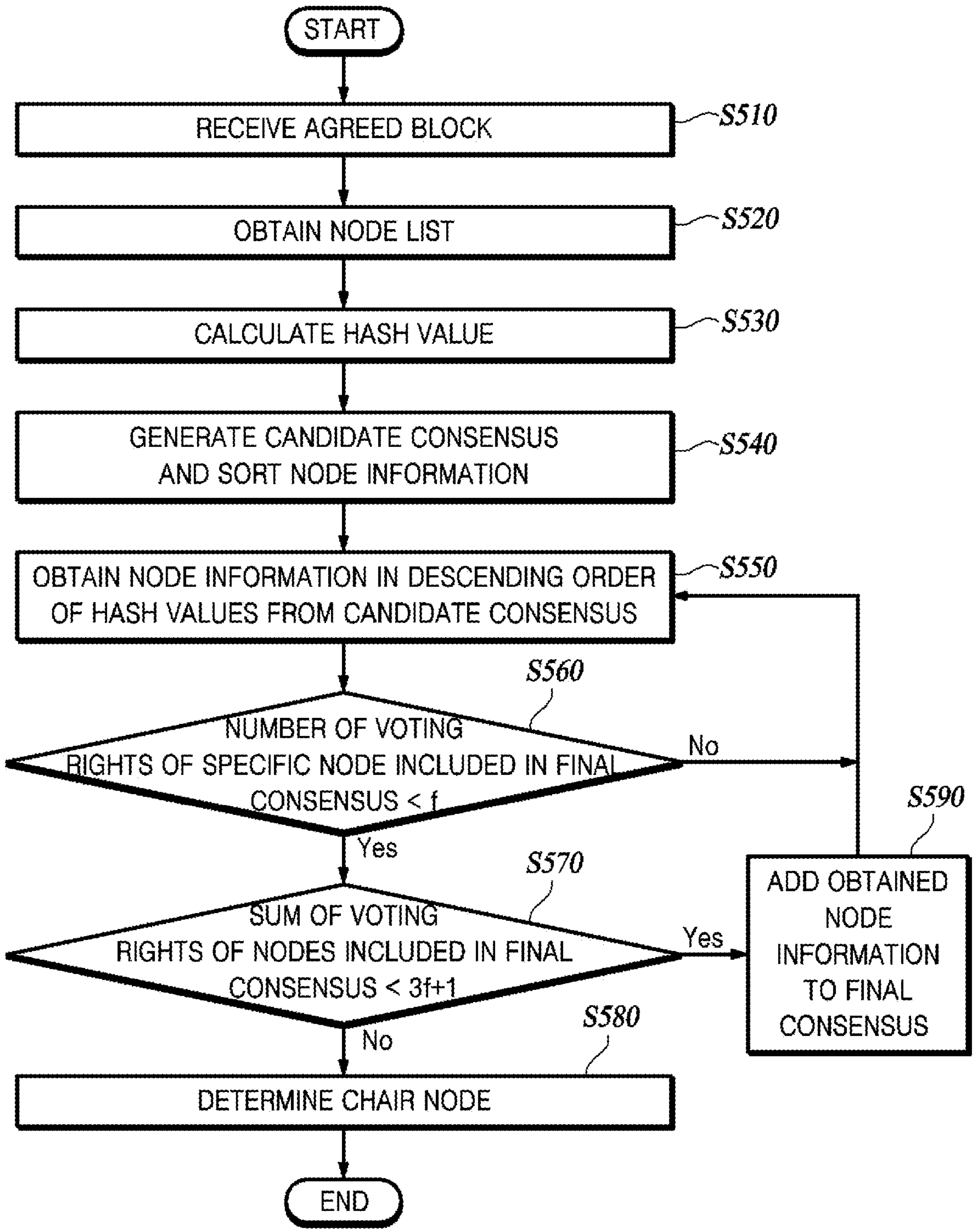
FIG. 5 is a flowchart illustrating a process of generating a consensus for enduring a node failure, according to an embodiment of the present disclosure.

FIG. 5 is a flowchart illustrating a process of generating a consensus for enduring a node failure, according to an embodiment of the present disclosure.

Referring to FIG. 5, the hash value calculating unit 110 receives an agreed block (S510). The hash value calculating unit 110 obtains a node list (S520). The hash value calculating unit 110 calculates hash values using a header value of a block, a node list, and a hash function (S530). The candidate consensus generating unit 120 generates a candidate consensus by comparing the calculated hash values with a threshold value and sorts the node information in the candidate consensus in descending order of hash values (S540). The final consensus generating unit 130 obtains node information from the candidate consensus in descending order of hash values (S550).

The final consensus generating unit 130 determines whether the number of voting rights of a specific node included in the final consensus is less than f (S560). Here, the specific node is a node having the node ID of the node information obtained in S550. If it is determined that the number of voting rights of the specific node included in the final consensus is equal to or exceeds f (S560-NO), the final consensus generating unit 130 obtains node information from the candidate consensus in descending order of hash values (S550). If it is determined that the number of voting rights of the specific node included in the final consensus is less than f (S560—YES), the final consensus generating unit 130 determines whether the sum of voting rights of nodes included in the final consensus is less than (3f+1), which is the consensus quorum (S570). If it is determined that the sum of voting rights of the nodes included in the final consensus is not less than (3f+1) (S570-NO), the final consensus generating unit 130 determines a chair node among the nodes included in the final consensus (S580). The final consensus generating unit 130 determines a node having the smallest hash value as a chair node. If it is determined that the sum of voting rights of the nodes included in the final consensus is less than (3f+1) (S570—YES), the final consensus generating unit 130 adds the obtained node information to the final consensus (S590). the final consensus generating unit 130 obtains node information from the candidate consensus in descending order of hash values (S550).

Figure 6:
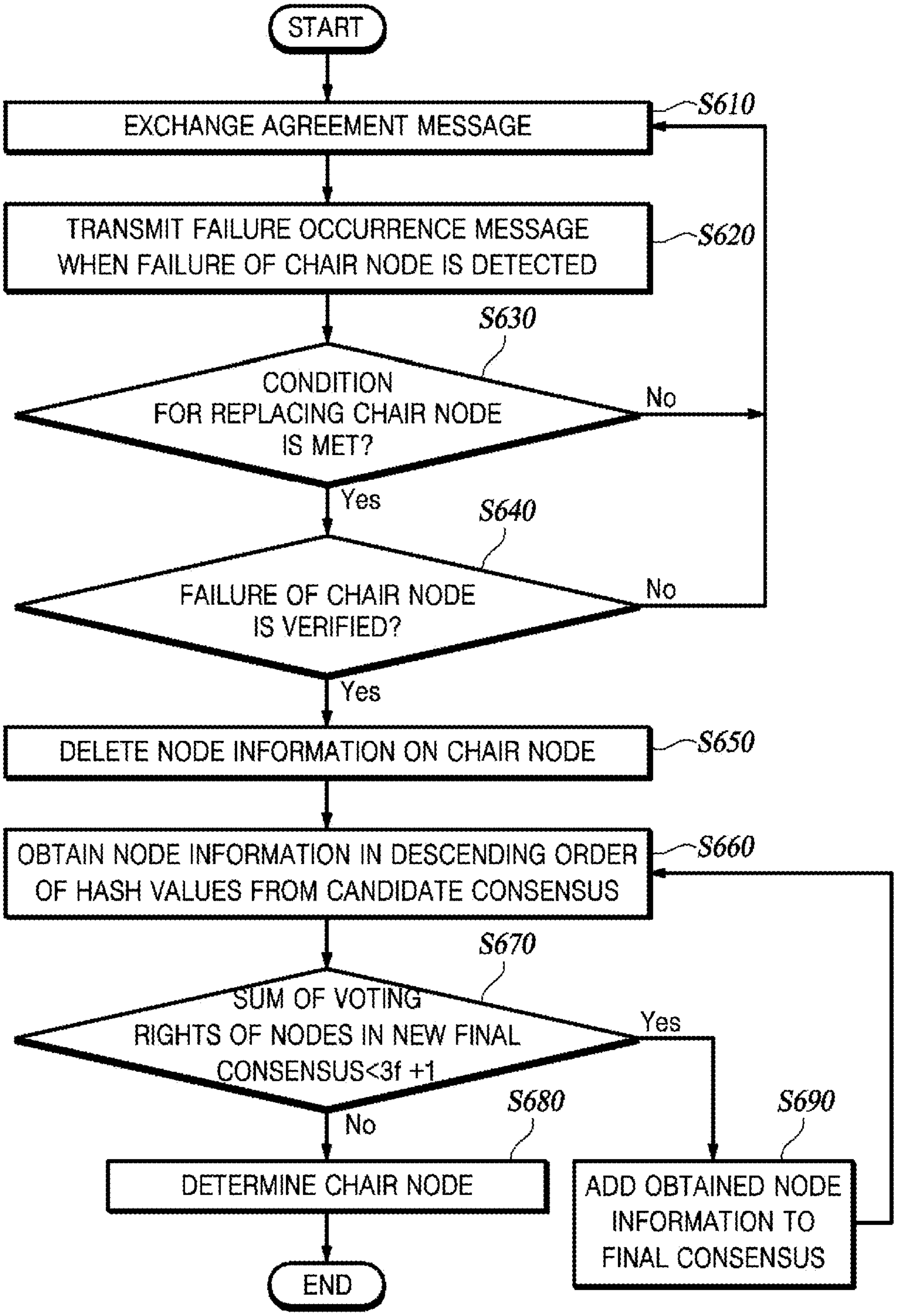
FIG. 6 is a flowchart illustrating a process of generating a consensus for enduring a failure of a chair node, according to an embodiment of the present disclosure.

FIG. 6 is a flowchart illustrating a process of generating a consensus for enduring a failure of the chair node, according to an embodiment of the present disclosure.

Referring to FIG. 6, nodes included in the existing final consensus perform an agreement by exchanging agreement messages (S610). When a failure of a chair node is detected, nodes excluding the chair node transmit a failure occurrence message to all nodes connected to the blockchain network (S620). All nodes connected to the blockchain network, excluding the chair node, determine whether conditions for replacing the chair node is met (S630). The conditions for replacing the chair node are a condition on whether the node that transmitted the failure occurrence message is a node included in the existing final consensus, and a condition on whether all nodes included in the existing final consensus, excluding the chair node, transmitted the failure occurrence message.

If it is determined that the conditions for replacing the chair node are not met (S630-NO), the nodes included in the existing final consensus perform an agreement by exchanging agreement messages (S610). If it is determined that the conditions for replacing the chair node are met (S630—YES), all nodes connected to the blockchain network excluding the chair node verify the failure of the chair node (S640). If the failure of the chair node is not verified (S640-NO), the nodes included in the existing final consensus perform an agreement by exchanging consensus messages (S610). If the failure of the chair node is verified (S640—YES), the occurrence of a failure of the chair node is confirmed, and the candidate consensus generating unit 120 deletes the node information on the chair node in the candidate consensus (S650).

The final consensus generating unit 130 obtains node information in descending order of hash values from candidate consensus from which the node information on the chair node has been deleted (S660). The final consensus generating unit 130 determines whether the sum of voting rights of nodes included in the new final consensus is less than (3f+1), which is the consensus quorum (S670). If it is determined that the sum of voting rights of the nodes included in the new final consensus is not less than (3f+1) (S670-NO), the final consensus generating unit 130 determines a chair node among the nodes included in the final consensus (S680). The final consensus generating unit 130 may determine a node having the smallest hash value within the final consensus as a chair node. If it is determined that the sum of voting rights of the nodes included in the new final consensus is less than (3f+1) (S670—YES), the final consensus generating unit 130 adds the obtained node information to the final consensus (S690). The final consensus generating unit 130 obtains node information in descending order of hash values from candidate consensus from which the node information on the chair node has been deleted (S660).

Figure 7:
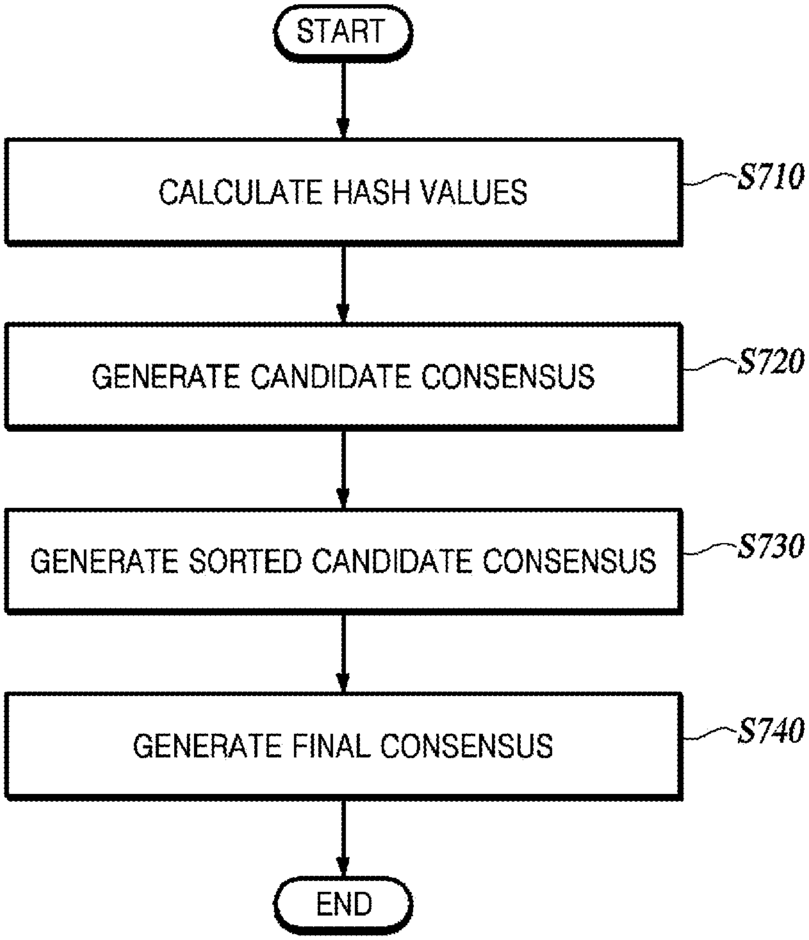
FIG. 7 is a flowchart illustrating a process of generating a consensus for enduring a node failure, according to another embodiment of the present disclosure.

FIG. 7 is a flowchart illustrating a process of generating a consensus for enduring a node failure, according to another embodiment of the present disclosure.

Referring to FIG. 7, the hash value calculating unit 110 may calculate hash values using a header value of a block and node list (S710). The hash values may be calculated using a hash function. The node list may include information on a node ID and the number of voting right of each node. The candidate consensus generating unit 120 generate a candidate consensus by comparing the hash values with a threshold value to (S720). The process of generating a candidate consensus may include generating a candidate consensus using node information including hash values that are equal to or smaller than the threshold value among hash values. The threshold value may be any value. The threshold value may be a predefined value.

The candidate consensus generating unit 120 sorts the node information in the candidate consensus to generate a sorted candidate consensus (S730). The process of generating the sorted candidate consensus may include sorting node information in the candidate consensus in descending order of hash values to generate a sorted candidate consensus.

The final consensus generating unit 130 generates a final consensus by selecting the node information in the candidate consensus sorted based on the number of voting rights of each node as many as the consensus quorum (S740). The consensus generating apparatus 10 determines a node having the smallest hash value among the nodes included in the final consensus as a chair node. The process of generating the final consensus may include a process of generating the final consensus using the node information in the candidate consensus sorted so that the number of voting rights of the nodes included in the final consensus does not exceed a first value. The node information may be information on a node ID and a hash value pair. The first value may be any positive integer value. The first value may be a predefined value. The consensus quorum may be a value obtained by multiplying the first value by 3 and adding 1 to the value.

Figure 8:
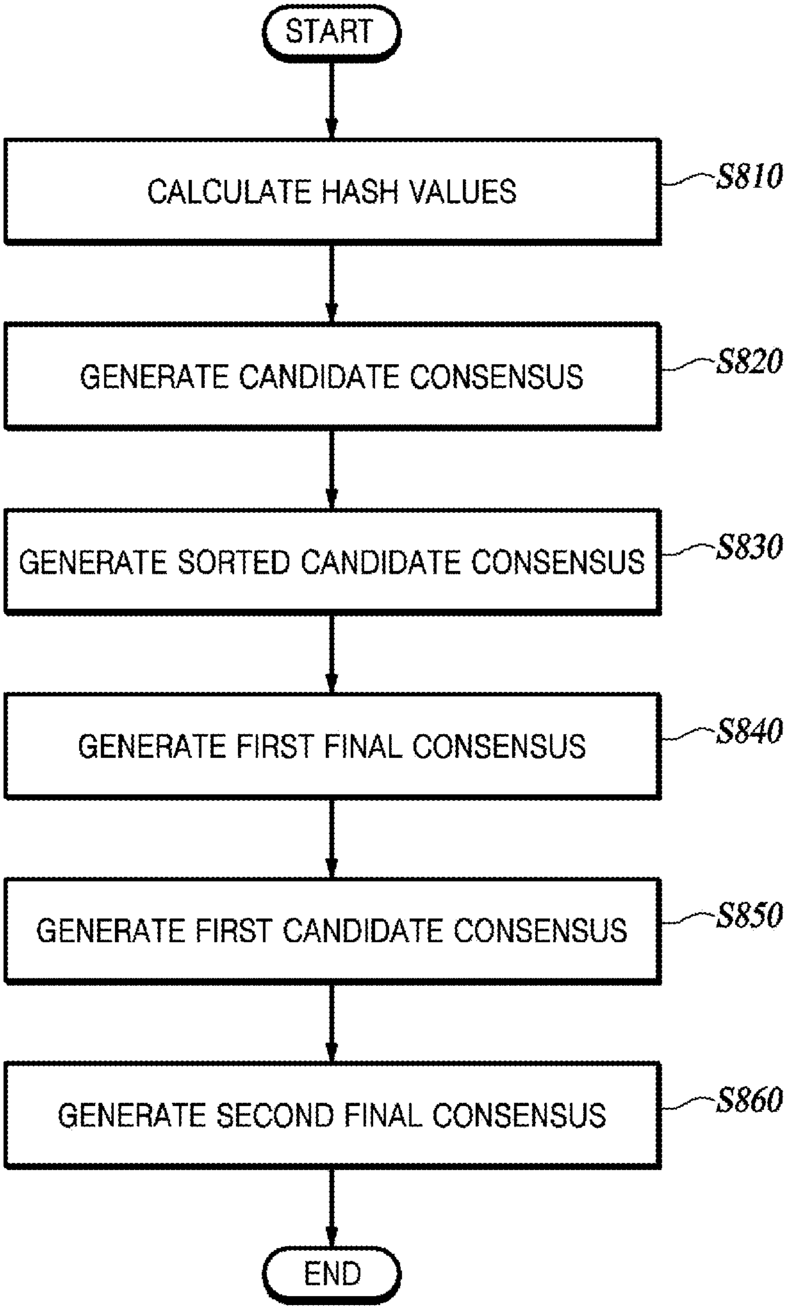
FIG. 8 is a flowchart illustrating a process of generating a consensus for enduring a failure of a chair node, according to another embodiment of the present disclosure.

FIG. 8 is a flowchart illustrating a process of generating a consensus for enduring a failure of a chair node, according to another embodiment of the present disclosure.

Referring to FIG. 8, the hash value calculating unit 110 calculates hash values using a header value of the block and a node list (S810). Hash values may be calculated using a hash function. The node list may include information on a node ID and the number of voting rights of each node. The candidate consensus generating unit 120 generates a candidate consensus by comparing the hash values with a threshold value (S820). The process of generating a candidate consensus may include a process of generating a candidate consensus using the node information including hash values equal to or smaller than the threshold value among the hash values. The threshold value may be any value. The threshold value may be a predefined value.

The candidate consensus generating unit 120 sorts the node information in the candidate consensus to generate a sorted candidate consensus (S830). The process of generating a sorted candidate consensus may include a process of sorting node information in the candidate consensus in descending order of hash values to generate a sorted candidate consensus.

The final consensus generating unit 130 selects the node information in the sorted candidate consensus as many as the consensus quorum to generate a first final consensus (S840). If a failure occurs in the chair node during an agreement, the candidate consensus generating unit 120 deletes the node information on the chair node from the node information in the sorted candidate consensus to generate a first candidate consensus (S850). The final consensus generating unit 130 generates a second final consensus using the node information in the first candidate consensus (S860). The consensus generating apparatus 10 may determine a node having the smallest hash value among the nodes included in the second final consensus as a new chair node. The process of generating the second final consensus may include a process of generating the second final consensus using the node information in the first candidate consensus based on the number of pieces of node information on the deleted chair node.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method performed by a consensus generating apparatus, the method comprising:

calculating hash values using a header value of a block and a node list;

generating a candidate consensus by comparing the hash values with a threshold value;

generating a sorted candidate consensus by sorting node information in the candidate consensus; and generating a first final consensus by selecting node information in the sorted candidate consensus as many as a consensus quorum based on a number of voting rights of each node and performing an agreement;

generating a first candidate consensus by deleting node information on a chair node from among the node information in the sorted candidate consensus when a failure occurs in the chair node during the agreement; and generating a second final consensus using node information in the first candidate consensus, wherein the node information is information on a node ID and a hash value pair, and wherein the node list includes information on a node ID and a number of voting rights of each node.

2. The method of claim 1, wherein the calculating the hash values comprises:

calculating the hash values using a hash function.

3. The method of claim 1, wherein the generating the candidate consensus comprises:

generating the candidate consensus using node information including hash values equal to or smaller than the threshold value among the hash values.

4. The method of claim 1, wherein the generating the sorted candidate consensus comprises:

generating the sorted candidate consensus by sorting the node information in the candidate consensus in descending order of hash values.

5. The method of claim 1, wherein the threshold value is an arbitrary value.

6. The method of claim 1, wherein the generating the first final consensus comprises:

generating the first final consensus using the node information in the sorted candidate consensus so that a number of voting rights of nodes included in the first final consensus does not exceed a first value.

7. The method of claim 6, wherein the first value is a positive integer value.

8. The method of claim 7, wherein the consensus quorum is a value obtained by multiplying the first value by 3 and adding 1 to the value.

9. The method of claim 1, further comprising:

determining, as a chair node, a node having the smallest hash value among nodes included in the final consensus.

10. A method performed by a consensus generating apparatus, the method comprising:

calculating hash values using a header value of a block and a node list;

generating a candidate consensus by comparing the hash values with a threshold value;

generating a sorted candidate consensus by sorting node information in the candidate consensus;

generating a first final consensus by selecting node information in the sorted candidate consensus as many as a consensus quorum and performing an agreement;

generating a first candidate consensus by deleting node information on a chair node from among the node information in the sorted candidate consensus when a failure occurs in the chair node during the agreement; and generating a second final consensus using node information in the first candidate consensus, wherein the node information is information on a node ID and a hash value pair, and wherein the node list includes information on a node ID and a number of voting rights of each node.

11. The method of claim 10, wherein the calculating the hash values comprises:

calculating the hash values using a hash function.

12. The method of claim 10, wherein the generating the candidate consensus comprises:

generating the candidate consensus using node information including hash values equal to or smaller than the threshold value among the hash values.

13. The method of claim 10, wherein the generating the sorted candidate consensus comprises:

generating the sorted candidate consensus by sorting the node information in the candidate consensus in descending order of hash values.

14. The method of claim 10, wherein the threshold value is an arbitrary value.

15. The method of claim 10, wherein the generating the second final consensus comprises:

generating the second final consensus using the node information in the first candidate consensus based on a number of pieces of deleted node information on the chair node.

16. The method of claim 10, further comprising:

determining, as a chair node, a node having the smallest hash value among the nodes included in the second final consensus.

17. A consensus generating apparatus comprising:

a memory; and at least one processor, wherein the at least one processor is configured to:

calculate hash values using a header value of a block and a node list;

generate a candidate consensus by comparing the hash values with a threshold value;

generate a sorted candidate consensus by sorting node information in the candidate consensus; and generate a first final consensus by selecting node information in the sorted candidate consensus as many as a consensus quorum based on a number of voting rights of each node and perform an agreement;

generate a first candidate consensus by deleting node information on a chair node from among the node information in the sorted candidate consensus when a failure occurs in the chair node during the agreement; and generate a second final consensus using node information in the first candidate consensus, wherein the node information is information on a node ID and a hash value pair, and wherein the node list includes information on a node ID and a number of voting rights of each node.

* * * * *